US012600372B2

(12) United States Patent
Hajiloo et al.

(10) Patent No.: US 12,600,372 B2
(45) Date of Patent: Apr. 14, 2026

(54) OPTIMIZATION OF VEHICLE PERFORMANCE TO SUPPORT VEHICLE CONTROL

(71) Applicant: GM Global Technology Operations LLC, Detroit, MI (US)

(72) Inventors: Reza Hajiloo, Richmond Hill (CA); Seyedeh Asal Nahidi, North York (CA); Gianmarc Coppola, Richmond Hill (CA); SeyedAlireza Kasaiezadeh Mahabadi, Novi, MI (US); Mohammad Pournazeri, Etobicoke (CA); Christopher Morgan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 18/645,641

(22) Filed: Apr. 25, 2024

(65) Prior Publication Data

US 2025/0333070 A1     Oct. 30, 2025

(51) Int. Cl.
    *B60W 50/10*     (2012.01)
    *B60W 50/00*     (2006.01)

(52) U.S. Cl.
    CPC ........ *B60W 50/10* (2013.01); *B60W 50/0097* (2013.01); *B60W 2556/35* (2020.02)

(58) Field of Classification Search
    CPC ............. B60W 30/143; B60W 40/105; B60W 50/0097; B60W 2050/0031; B60W 2520/10; B60W 2720/103
    See application file for complete search history.

(56) References Cited

U.S. PATENT DOCUMENTS

| | | | |
|---|---|---|---|
| 11,731,654 B2 | 8/2023 | Suissa | |
| 2014/0277835 A1* | 9/2014 | Filev | G01C 21/3469 |
| | | | 701/2 |
| 2016/0318513 A1* | 11/2016 | Lee | B60W 10/20 |
| 2020/0218272 A1* | 7/2020 | Ellis | G05D 1/0088 |

(Continued)

FOREIGN PATENT DOCUMENTS

| | | | | |
|---|---|---|---|---|
| WO | WO-2018086133 A1 * | 5/2018 | | H04N 23/90 |

OTHER PUBLICATIONS

German Office Action for German Application No. 102024121494. 5; dated Jan. 21, 2025; 5 pages.

*Primary Examiner* — Mohamad O El Sayah
(74) *Attorney, Agent, or Firm* — CANTOR COLBURN LLP

(57) ABSTRACT

A system for interacting with a vehicle user includes an optimization module configured to determine a control strategy for traversing a selected route based on a probabilistic prediction of actuator inputs, a monitoring module configured to monitor vehicle motion and driver inputs during operation of a vehicle over the selected route, and a prediction module configured to predict an optimal local path for traversing a section of the selected route, and predict a set of optimal actuator control actions. The system also includes an interface module configured to present a suggested set of actuator commands to the vehicle user based on the set of optimal actuator control actions, and a control system configured to control the vehicle to execute the suggested set of actuator commands based on the user accepting the suggested set of actuator commands.

20 Claims, 5 Drawing Sheets

10 —

(56)        References Cited

U.S. PATENT DOCUMENTS

| | | | |
|---|---|---|---|
| 2021/0192975 A1* | 6/2021 | Spence | G01C 21/365 |
| 2022/0242422 A1* | 8/2022 | Thompson | B60W 30/09 |
| 2023/0141585 A1* | 5/2023 | Newman | G06F 9/451 |
| | | | 427/136 |
| 2023/0406314 A1* | 12/2023 | Adiprasito | B60W 60/001 |
| 2024/0059325 A1 | 2/2024 | Rubin et al. | |
| 2024/0317008 A1* | 9/2024 | Giovanardi | G01C 21/30 |
| 2025/0121845 A1* | 4/2025 | Rosman | B60W 50/14 |

* cited by examiner

OPTIMIZATION OF VEHICLE PERFORMANCE TO SUPPORT VEHICLE CONTROL

INTRODUCTION

The subject disclosure relates to the art of vehicle control. More particularly, the subject disclosure relates to systems and methods for optimizing user control of a vehicle.

Vehicles are increasingly equipped with sensors and perception devices that improve the awareness of vehicle control systems and drivers, and can thereby provide for autonomous control and/or driver support. In many cases, such as high performance driving on a racetrack, drivers are consistently looking for ways to improve overall performance. As there are many variables that can affect performance, as well as a myriad of potential emergency events that can arise, it is desirable to provide systems that support drivers to improve their overall performance.

SUMMARY

In one exemplary embodiment, a system for interacting with a vehicle user includes an optimization module configured to determine a control strategy for traversing a selected route based on a probabilistic prediction of actuator inputs, a monitoring module configured to monitor vehicle motion and vehicle user inputs during operation of a vehicle over the selected route, and a prediction module configured to predict an optimal local path for traversing a section of the selected route, and predict a set of optimal actuator control actions. The system also includes an interface module configured to present a suggested set of actuator commands to the vehicle user based on the set of optimal actuator control actions, and a control system configured to control the vehicle to execute the suggested set of actuator commands based on the vehicle user accepting the suggested set of actuator commands.

In addition to one or more of the features described herein, the system includes a data fusion module configured to select a detection method for detecting each of a plurality of emergency events, the detection method specifying a combination of one or more types of detection data.

In addition to one or more of the features described herein, the detection method is selected based on a probability of an emergency event being detected by the selected detection method, and a reliability of the selected detection method.

In addition to one or more of the features described herein, the control strategy is determined based on a driver model and a vehicle model, and prescribes actuator input values over time that maximize performance of the vehicle in traversing the selected route.

In addition to one or more of the features described herein, the control strategy is determined based on a surrogate model constructed from the driver model.

In addition to one or more of the features described herein, the prediction module is configured to probabilistically predict the optimal local path over a plurality of successive time horizons based on the control strategy and a probability of encountering an emergency event during each successive time horizon.

In addition to one or more of the features described herein, the selected route is a pre-planned route along a road having known parameters, and the control strategy is determined to optimize actuator inputs to minimize an amount of time required to traverse the pre-planned route.

In another exemplary embodiment, a method of interacting with a vehicle user includes determining, by an optimization module, a control strategy for traversing a selected route based on a probabilistic prediction of actuator inputs, monitoring vehicle motion and vehicle user inputs during operation of a vehicle over the selected route, and predicting, by a prediction module, an optimal local path for traversing a section of the selected route, and predicting a set of optimal actuator control actions. The method also includes presenting a suggested set of actuator commands to the vehicle user based on the set of optimal actuator control actions, and controlling the vehicle to execute the suggested set of actuator commands based on the vehicle user accepting the suggested set of actuator commands.

In addition to one or more of the features described herein, the method includes selecting a detection method for detecting each of a plurality of emergency events, the detection method specifying a combination of one or more types of detection data.

In addition to one or more of the features described herein, the detection method is selected based on a probability of an emergency event being detected by the selected detection method, and a reliability of the selected detection method.

In addition to one or more of the features described herein, the control strategy is determined based on a driver model and a vehicle model, and prescribes actuator input values over time that maximize performance of the vehicle in traversing the selected route.

In addition to one or more of the features described herein, the control strategy is determined based on a surrogate model constructed from the driver model.

In addition to one or more of the features described herein, predicting the optimal local path includes probabilistically predicting the optimal local path over a plurality of successive time horizons based on the control strategy and a probability of encountering an emergency event over each successive time horizon.

In addition to one or more of the features described herein, the selected route is a pre-planned route along a road having known parameters, and the control strategy is determined to optimize actuator inputs to minimize an amount of time required to traverse the pre-planned route.

In yet another exemplary embodiment, a vehicle system includes a memory having computer readable instructions and a processing device for executing the computer readable instructions. The computer readable instructions control the processing device to determine a control strategy for traversing a selected route based on a probabilistic prediction of actuator inputs, monitor vehicle motion and vehicle user inputs during operation of the vehicle over the selected route, predict an optimal local path for traversing a section of the selected route, predict a set of optimal actuator control actions, present a suggested set of actuator commands to the vehicle user based on the set of optimal actuator control actions, and control the vehicle to execute the suggested set of actuator commands based on the vehicle user accepting the suggested set of actuator commands.

In addition to one or more of the features described herein, the vehicle system includes a data fusion module configured to select a detection method for detecting each of a plurality of emergency events, the detection method specifying a combination of one or more types of detection data.

In addition to one or more of the features described herein, the detection method is selected based on a probability of an emergency event being detected by the selected detection method, and a reliability of the selected detection method.

In addition to one or more of the features described herein, the control strategy is determined based on a driver model and a vehicle model, and prescribes actuator input values over time that maximize vehicle performance in traversing the selected route.

In addition to one or more of the features described herein, the control strategy is determined based on a surrogate model constructed from a driver model.

In addition to one or more of the features described herein, predicting the optimal local path includes probabilistically predicting the optimal local path over a plurality of successive time horizons based on the control strategy and a probability of encountering an emergency event over each successive time horizon.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
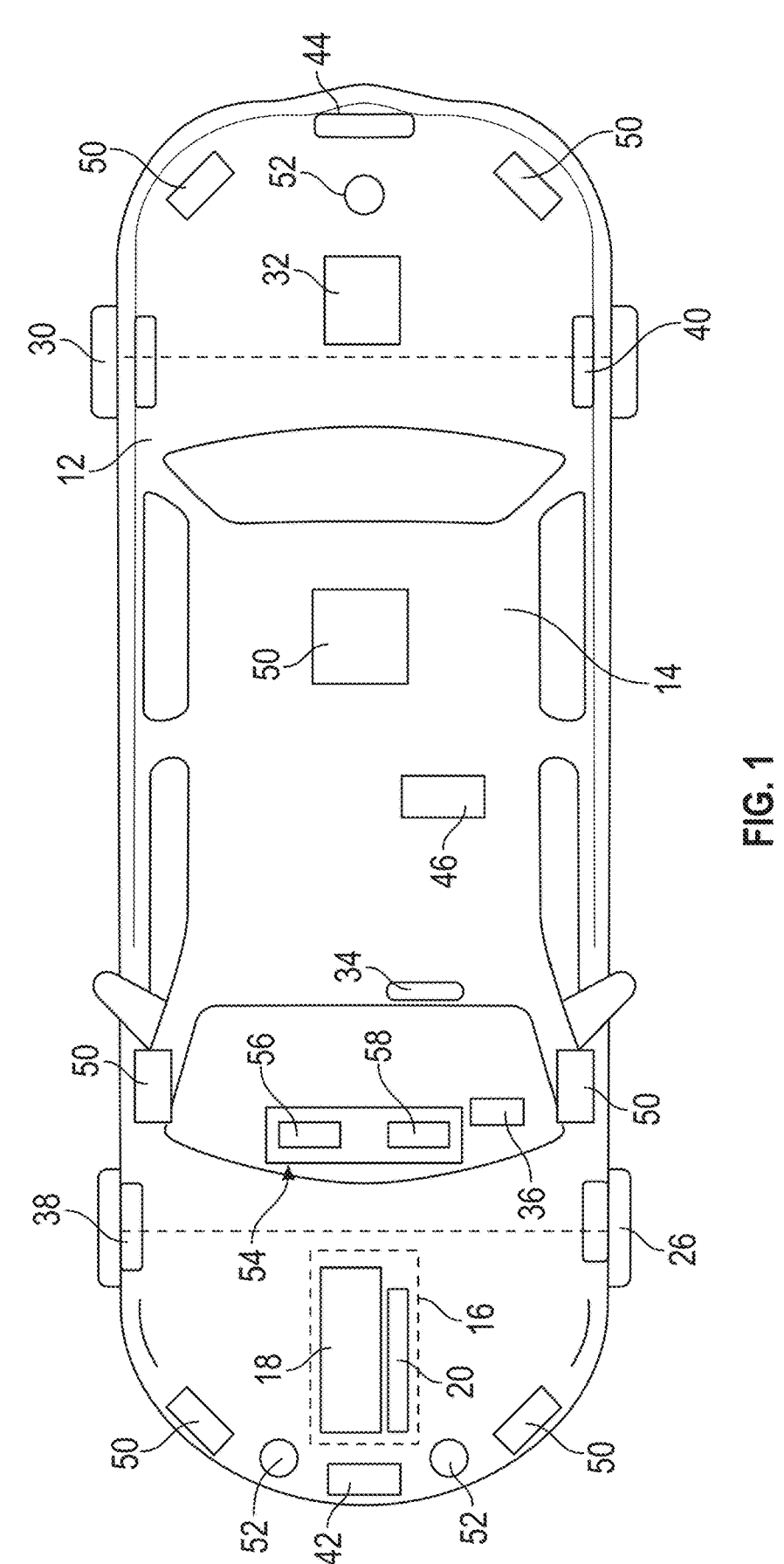
FIG. 1 is a top view of a motor vehicle including aspects of a user interaction and prediction system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems are provided for supporting collaborative operation of a vehicle. An embodiment of a system is configured to collaborate or cooperate with a driver by monitoring vehicle operation during traversal of a route, and determine an optimal set of controls (actuator inputs) that are predicted to optimize performance of the vehicle in traversing the route. The optimal set of controls is presented to a driver as a suggestion for improving performance. The driver has the option of accepting the suggestion, either by directly inputting actuator commands (e.g., controlling steering and throttle) or by providing an indication to the system.

Embodiments described herein present a number of advantages. For example, the embodiments provide for enhancing vehicle response and improvement of driver performance. The embodiments provide for improved real-time information for drivers, increasing their understanding of a vehicle's environment and presenting opportunities for increased driver performance (e.g., increased lap times). Embodiments also provide predictive control for fast and controlled responses to potential emergencies. Integration (data fusion) from various sources can be used to predict and assess the likelihood of emergencies, thereby enhancing the ability to respond to such emergencies.

For example, when driving on a racetrack, the driver may not be sure as to what path to follow (e.g., when on a curve) and/or speed to choose. The embodiments provide information to the driver so that the driver can maximize lap times. In addition, the embodiments assist the driver in responding to events so that performance is maximized. Such information can be quickly and intuitively presented to the driver so that the driver can make decisions more quickly.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion systems 16 and other vehicle components, such as a braking subsystem, a suspension system, a steering subsystem, and if the vehicle is a hybrid electric vehicle, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. In an embodiment, the propulsion system 16 includes an electric motor 20, and may include one or more additional motors positioned at various locations, such as a motor 32. The vehicle 10 may be a fully electric vehicle having one or more electric motors.

The vehicle 10 also includes various control devices for controlling aspects of vehicle operation. Such devices include, for example, the engine 18 and motors 20 and 32, a steering wheel 34, an acceleration pedal 36, front brakes 38 connected to front wheels 26 and rear brakes 40 connected to rear wheels 30. Other actuators may include a front downforce actuator 42 and/or a rear downforce actuator 44 (e.g., if the vehicle 10 is a high performance vehicle). Control devices and actuators are controllable via one or more control units, collectively represented by a controller 46. Various sensors are included for monitoring vehicle motion an operation, such as torque sensors, pedal position sensors, brake sensors, an inertial measurement unit (IMU) and others.

The vehicle also includes an environment monitoring system for detecting and monitoring the environment around the vehicle. The monitoring system includes, for example, one or more optical cameras 50 configured to take images, which may be still images and/or video images. Additional devices or sensors may be included, such as one or more radar assemblies 52 included in the vehicle 10. The monitoring system is not so limited and may include other types of sensors, such as lidar and infrared.

The vehicle 10, monitoring system, the controller 46 and other vehicle systems include or are connected to an on-board computer system 54 that includes one or more processing devices 56 and a user interface 58. The user interface 58 may include a touchscreen, a speech recognition system and/or various buttons for allowing a user to interact with features of the vehicle. The user interface 58 may be configured to interact with a user or driver via visual communications (e.g., text and/or graphical displays), tactile communications or alerts (e.g., vibration), and/or audible communications. The on-board computer system 54 may also include or communicate with devices for monitoring the user or driver, such as interior cameras and image analysis components. Such devices may be incorporated into a driver monitoring system (DMS).

The user interface 58 may include various types of displays and/or other devices that can interact with and/or impart information to a user. For example, the vehicle 10 may include a display screen (e.g., console screen, full display mirror or FDM, etc.). In one embodiment, the vehicle 10 includes one or more heads up displays (HUDs). Other devices that may be incorporated include indicator lights, haptic devices, interior lights, auditory communication devices, and others. Haptic devices (tactile interfaces) include, for example, vibrating devices in the vehicle steering wheel and/or seat. The various displays, haptic devices, lights, and auditory devices are configured to be used in various combinations to present information and recommendations to a user.

Figure 2:
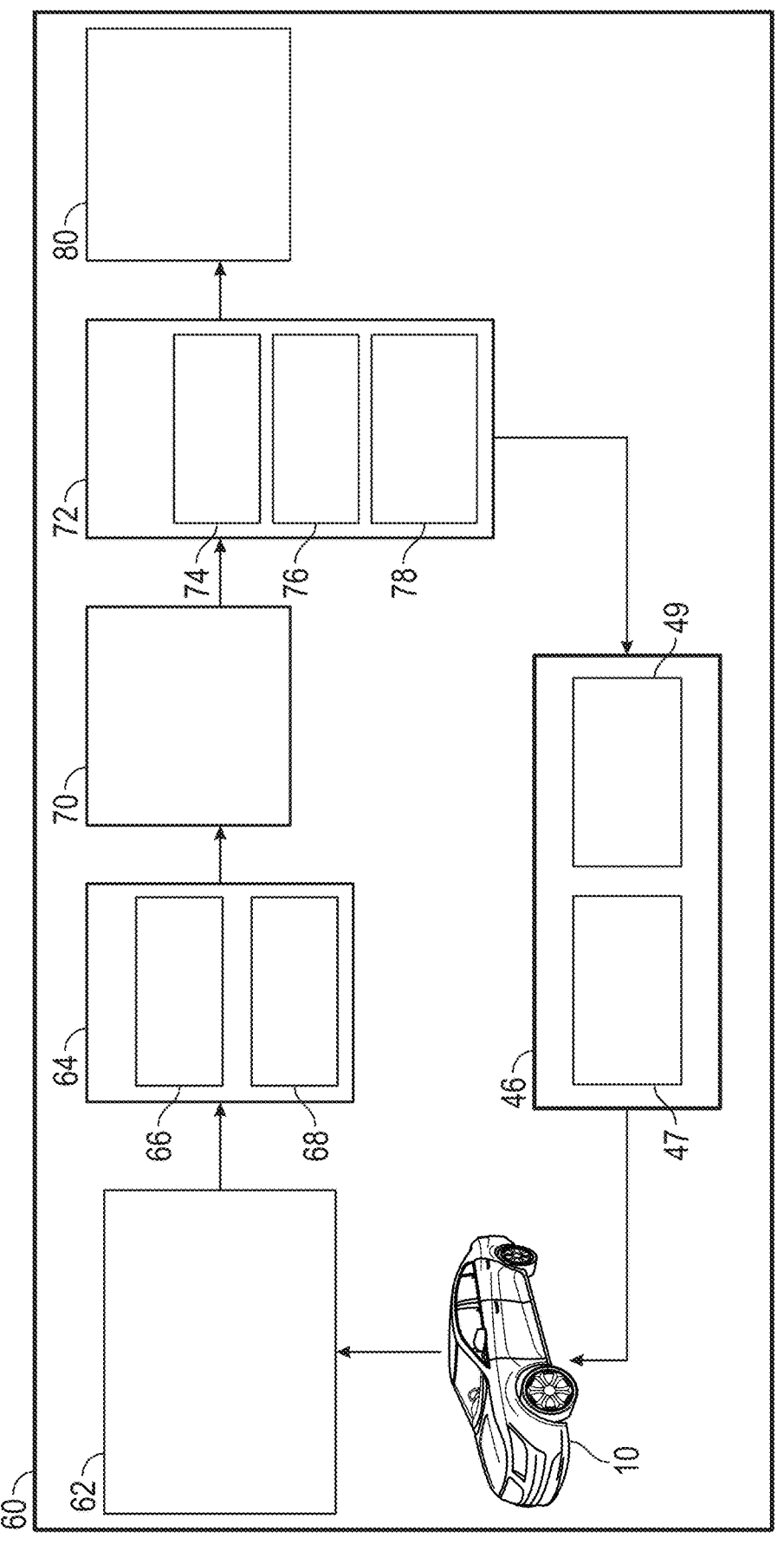
FIG. 2 depicts a prediction and user interaction system, in accordance with an exemplary embodiment.

FIG. 2 depicts an embodiment of a prediction and user interaction system 60, which is configured to cooperate with a user or driver during vehicle operation to optimize or increase performance. All or part of the system 60 may be incorporated in the vehicle computer system 54, the controller 46, and/or any other suitable processing devices or control systems.

The system 60 includes a perception and estimation module 62 configured to collect detection data from the environmental monitoring system. Examples of collection data includes camera images, radar/lidar images, object and feature detection using image processing and/or machine learning, and others.

A data fusion module 64 is configured to evaluate the collected data and determine detection methods for detecting emergency conditions or events. In an embodiment, the data fusion module 64 includes a reliability assessment module 66 for determining the reliability of various detection modalities (e.g., cameras, radar, weather data, global positioning system (GPS) data, etc.). A probability calculation module 68 may be included for calculating probabilities of emergency events as discussed further herein.

An "emergency event" is an event, feature or object, or condition that could arise as the vehicle is driven along a given route, and that requires some real time action or deviation to react thereto. Examples of emergency events include objects such as vehicles or pedestrians in the path of the vehicle 10, changes in road conditions, weather conditions and others.

A global optimization module 70 is configured to generate an optimal control strategy for traversing a planned route, and a prediction module 72 is used to predict optimal actuator inputs and vehicle controls for responding to emergency conditions. The prediction module may predict an optimal local path for a segment of the planned route (block 74), provide braking control predictions (block 76), downforce command predictions (78) and/or other predictions for inputs or commands to actuators for optimally responding to an emergency event.

A control device such as the controller 46 is configured to operate one or more actuators based on a user input. The actuator(s) may be operated based on direct user input, such as steering or engaging an acceleration pedal. Alternatively, or in addition, the actuator(s) may be operated by the controller 46 in response to user interaction with a user interface 80. For example, the controller 46 can operate actuators 42 and 44 (FIG. 1) for downforce control (e.g., via a downforce control module 47), and or/limited slip differential (LSD) control (e.g., via a LSD control module 49).

Figures 3, 4:
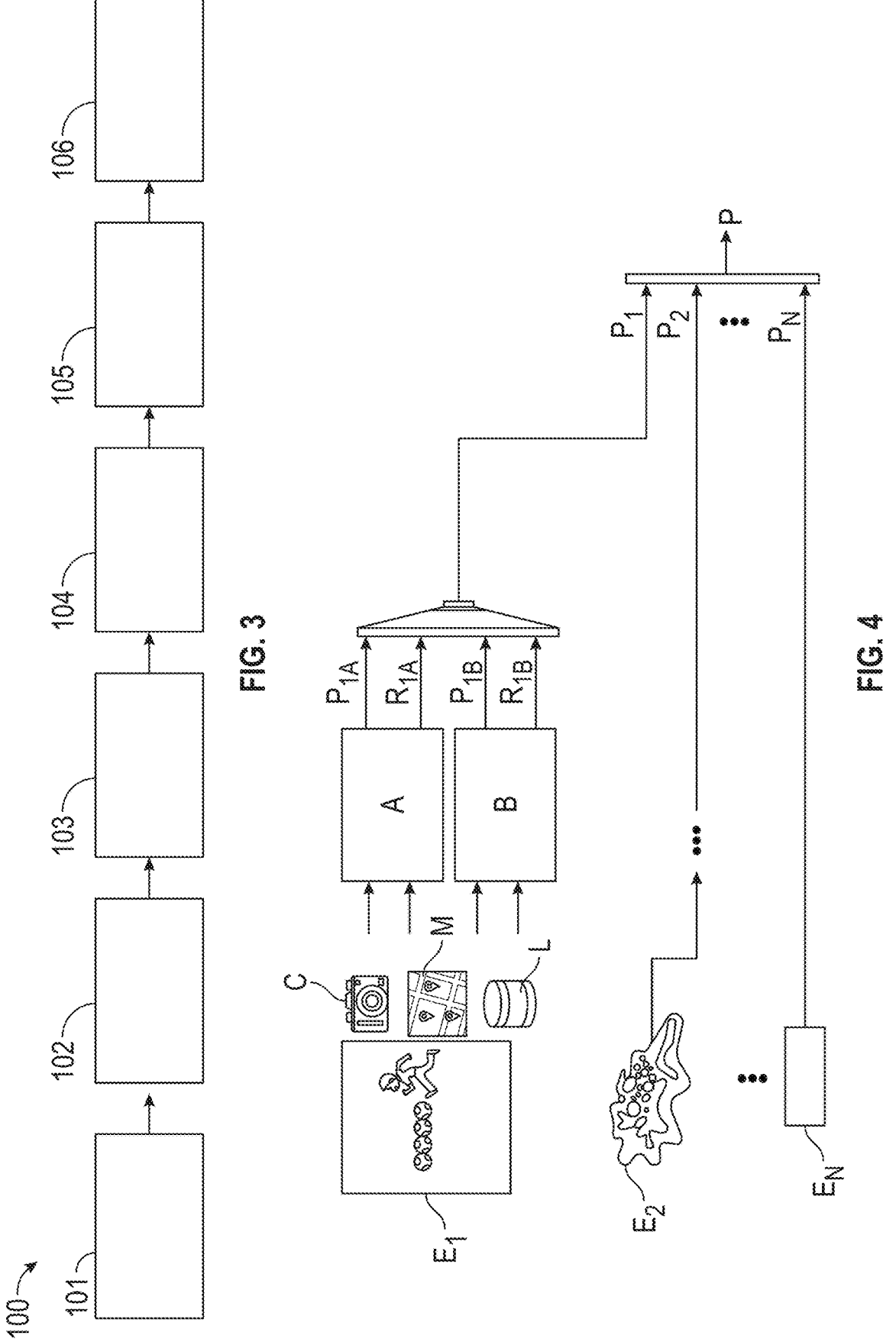
FIG. 3 is a flow diagram depicting aspects a of a prediction, control and user interaction method, in accordance with an exemplary embodiment.
FIG. 4 depicts a data fusion process used to determine detection methods for emergency events, in accordance with an exemplary embodiment.

FIG. 3 depicts a method 100, aspects of the which may be performed offline (e.g., global path optimization) or online (i.e. during vehicle operation). The method 100 is discussed in conjunction with blocks 101-106. The method 100 is not limited to the number or order of steps therein, as some steps represented by blocks 101-106 may be performed in a different order than that described below, or fewer than all of the steps may be performed. For example, if a selected route is not a pre-planned route along a roadway with known parameters (e.g., a racetrack), global optimization as discussed herein may be omitted.

The method 100 is discussed in conjunction with the vehicle of FIG. 1 and a processing system, which may be, for example, the computer system 54, the controller 46, or a combination thereof. The method 100 is also discussed with reference to the prediction and user interaction system 60 of FIG. 2. Aspects of the method 100 are discussed in conjunction with the vehicle 10 and the prediction and user interaction system 60 for illustration purposes. It is noted the method 100 is not so limited and may be performed by any suitable processing device or system, or combination of processing devices.

At block 101, the perception and estimation module 62 collects detection data. Detection data includes, for example, camera images, radar data, lidar data, GPS data, map data, temperature and/or any other suitable type of detection data.

At block 102, the data fusion module 64 combines different types of detection data, and uses the combined data to determine detection methods for different emergency events.

Generally, different sources of detection data and different algorithms may be appropriate for different events and conditions. For example, detection of objects may be most appropriate by using image and/or radar data, whereas detection of weather conditions may be most appropriately realized using GPS or location data (optionally with image data). In addition, conditions may affect the reliability of various modalities. For example, image data is more reliable in fair weather conditions. GPS data may also have different reliability, as location and/or weather conditions can affect signals reliability.

In an embodiment, the data fusion module 64 utilizes a methodology that considers the probability P of an emergency event occurring, and the reliability R of different types of detection data in determining an appropriate emergency detection algorithm and detection method. Probabilities P may be determined by the probability calculation module 68, and reliabilities R may be determined by the reliability assessment module 66.

FIG. 4 depicts an example of the methodology. In this example, the data fusion module 64 considers a number N of potential emergency events (Events $E_1$-$E_N$) and their associated probabilities ($P_1$-$P_N$).

In this example, "Method A" refers to detection of an event using camera data C, and "Method B" refers to detection of an event using lidar data L. Method A and/or Method B may include one or more additional types of detection data, such as map data M. In this example, $P_1$ refers to the probability of an obstacle or object entering the road (Event $E_1$), and $P_2$ refers to the probability of the vehicle encountering an ice patch or slippery condition (Event $E_2$).

For example, for Event $E_1$, $P_1$ is calculated as follows:

$$P_1 = \frac{(R_{1A}^c P_{1A} + R_{1B}^c P_{1B}}{R_{1A}^c + R_{1B}^c},$$

where c is a constant, $P_{1A}$ is the probability of Event E being detected using Method A, and $P_{1B}$ is the probability of Event $E_1$ being detected using Method B. $R_{1A}$ is a reliability of the data collected using Method A (determined based on weather conditions, visibility, etc.) and $R_{1B}$ is a reliability of the data collected using Method B.

If $P_1$ is sufficiently high, the emergency detection method for detecting Event E is a combination of Method A and Method B (camera and lidar data). If $P_1$ is not sufficiently high (i.e., does not meet or exceed a selected threshold), then Method A or Method B is selected, based on which reliability $R_{1A}$ or $R_{1B}$ is higher. Detection methods are similarly determined for the remaining events $E_2$ to $E_N$. It is noted that real time data can be collected during operation and used to update the probability and reliability scores where appropriate.

Referring again to FIG. 3, at block 103, the global optimization module 70 determines an optimal control strategy for traversing a selected route. The route may be a pre-planned route (e.g., a planned route specifying specific roads to travel, or a racetrack or other contained roadway).

In the following description, the selected route is a pre-planned route, and global optimization is performed to specify vehicle dynamics and actuator inputs that result in an optimal vehicle path and optimal actuator inputs. The optimization may be performed offline (e.g., prior to operating the vehicle) or online during operation.

The global optimization module 70 is not limited to pre-planned or pre-selected routes. For example, if the vehicle is not driving a pre-planned route, the optimization strategy can be performed in real time over relatively small time horizons to locally optimize performance.

In an embodiment, if the anticipated road properties (e.g., direction, banking, road surface) are known and the route is known (e.g., the route is a lap of a racetrack), a global optimization is performed to optimize vehicle operation over the route or a lap (lap time optimization).

Lap time optimization may be performed by determining optimal vehicle dynamics and actuator controls for successive track sections or time windows. For example, optimal pedal and steering inputs (and other actuators commands such as downforce controls) are determined for each section of a track or other known route. Examples of sections include straightaways and different curved sections (which each may have their own parameters such as path, turn radius, banking, road grade, etc.)

In an embodiment, the optimization is performed based on a driver model and a high fidelity vehicle model. This optimization determines optimal inputs for a route with known profiles and attributes, including track layout, banking and grading features, road boundaries and others.

The driver model simulates actuator inputs by a human driver, and may be represented by the following:

$$f(x) = \alpha x^2 + \beta x + \gamma,$$

where x represents a vehicle position, a vehicle speed, an actuator state or other variable related to position and/or dynamics, and $\alpha$, $\beta$, $\gamma$ are coefficients. For example, for brake speed control, brake input $A_{x,brake}$ can be represented by:

$$A_{x,brake} = \alpha V_x^2 + \beta V_x + \gamma,$$

where $V_x$ is brake speed, subject to maximum and minimum constraints. There may be any number of functions for each actuator input. Furthermore, the function for a given input may be any suitable polynomial.

The vehicle model simulates the vehicle response to driver inputs or actuator commands. Specifically, the vehicle's dynamic response (e.g., change in speed, direction, yaw, etc.) to different inputs is simulated. In an example, the vehicle model includes elements representing the vehicle body, wheels, tires, powertrain, suspension, brake, steering and others.

For example, the functions and coefficients for each actuator input are learned through a selected machine learning technique, such as deep learning or reinforcement learning.

To reduce computational costs associated with this optimization, in an embodiment, a surrogate model is used to evaluate objectives in each optimization cycle (i.e., each lap optimization or optimization for a section of the track).

A surrogate model mimics the behavior of the vehicle model and the driver model while being computationally cheaper. Surrogate optimization attempts to find a global minimum of an objective function (e.g., lap time) using a relatively small number of objective function evaluations.

Surrogate optimization is balanced between two goals: exploration and speed. Exploration is performed to find a global minimum. Speed is related to the number of objective function evaluations.

The surrogate optimization alternates between surrogate construction and search for a minimum. The surrogate model is constructed by evaluating an objective function (e.g., the driver model) at a number of points, and interpolating a radial basis function through these points.

The search for a minimum involves sampling random points (e.g., several thousand points) within constraints of an objective function $f(x)$. The objective function $f(x)$ is evaluated to derive a value of the objective function at one or more sample points, and the values are interpolated to create a surrogate model.

For a given point (an incumbent), a merit function is evaluated based on a value s(x) of the surrogate model at the incumbent, and on a distance of each point. The distance, denoted as D(x), is defined as a difference between the surrogate value at a point x and a value of the objective function at that point.

A merit function is determined by sampling points around the incumbent, and calculating the merit function based on the distances D(x) with respect to points x.

The best point (i.e., the point having the highest merit function value) is selected, and the objective function is evaluated at the best point. The surrogate model is then adjusted by updating the surrogate model at the best point with the objective function evaluation result.

In an embodiment, the merit function (denoted as $f_{merit}$(x)) is a weighted combination of a scaled surrogate model S(x) and distances D(x) as follows:

$$f_{merit}(x) = wS(x) + (1-w)D(x),$$

where w is a weight value. A larger value of w gives more importance to S(x), causing the surrogate optimization algorithm to minimize the surrogate model. A smaller value of w gives more importance to points with larger D(x) values, leading to searching new regions of the surrogate model.

The scaled surrogate model S(x) is based on a surrogate value s(x) at point x, as follows:

$$S(x) = (s(x) - s_{min})/(s_{max} - s_{min}),$$

where $s_{max}$ and $s_{min}$ are maximum and minimum values among the sample points.

The distance D(x) is defined based on a set of evaluated points, denoted as $x_j$, where j=1 . . . k. $d_{ij}$ is defined as the distance from a sample point i to an evaluated point k of the driver model. $d_{min}$ and $d_{max}$ are minimum and maximum values of the distance $d_{ij}$ among all evaluated and sampled points.

D(x) may be represented by the following:

$$D(x) = (d_{max} - d(x))/(d_{max} - d_{min}),$$

where d(x) is the minimum distance between a point x on the surrogate model and an evaluated point k.

At block 104, environmental uncertainties are accounted for, and local path optimization is performed, using a probabilistic prediction method. The prediction module 72 performs a local prediction during vehicle operation (e.g., as the vehicle traverses a section of a racetrack).

Generally, the prediction module 72 determines the probability of a given emergency event arising (i.e., an event or condition that the vehicle will encounter if no action is taken that deviates from a planned path).

Figure 5:
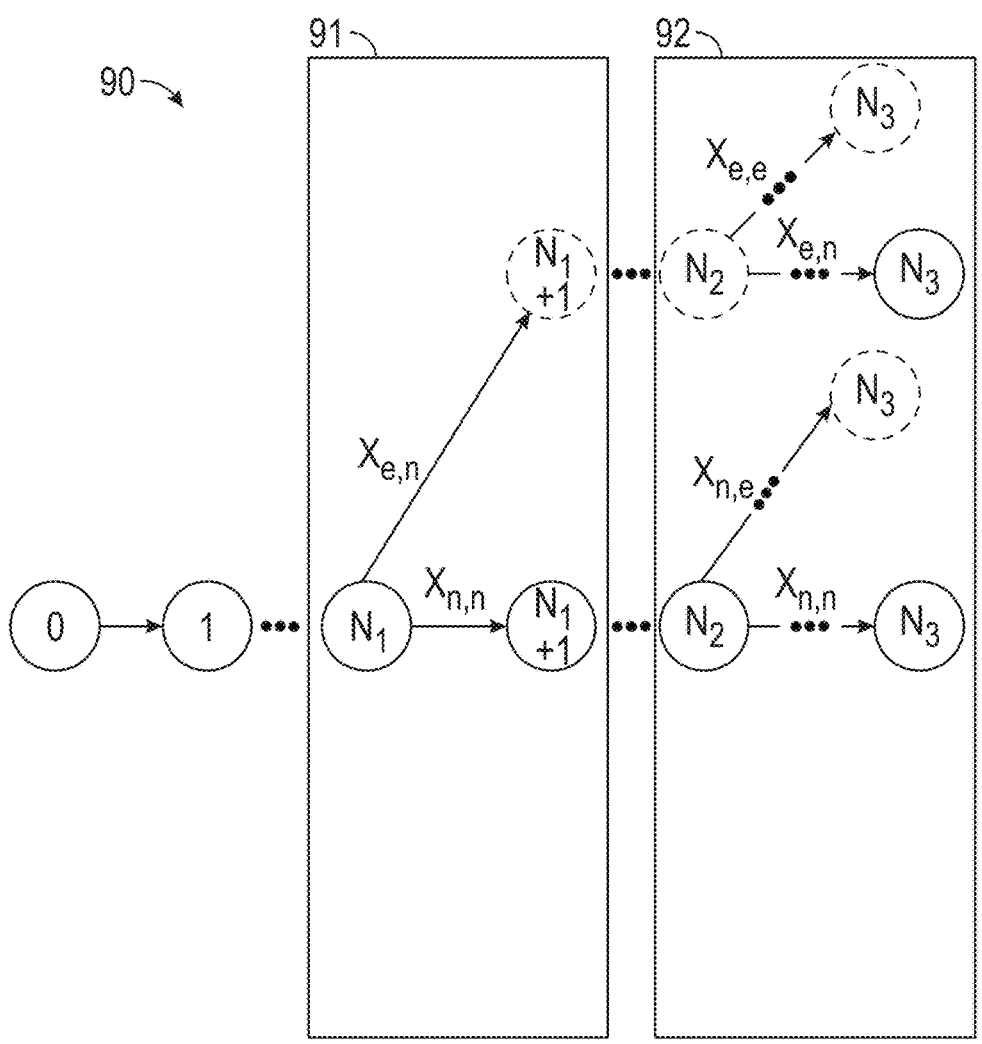
FIG. 5 depicts an example of a decision tree, in accordance with an exemplary embodiment.

Referring to FIG. 5, in an embodiment, the prediction module 72 utilizes a prediction tree to evaluate the probability of an emergency event (or any of a plurality of potential emergency events) arising for each of a plurality of prediction windows. The prediction windows are continuously updated as the vehicle is operated.

The prediction tree shows nominal and emergency prediction branches with associated probabilities. For example, as shown in FIG. 5, a prediction tree 90 includes nodes or time steps, and branches representing nominal conditions (no emergency event, the vehicle can continue as normal). The prediction tree 90 also includes branches for emergency conditions. Any number of prediction windows, branches and nodes may be generated, and are thus not limited to those shown in FIG. 5.

As shown, the prediction tree 90 includes nodes 0, 1, $N_1$, $N_1+1$, $N_2$ and $N_3$, each with an associated position state xi. The subscripts i include a subscript n indicative of a nominal condition and a subscript e indicative of an emergency event. The number of subscripts is based on a number of probable emergency events. In the example of FIG. 5, there is a first emergency event in a first time horizon 91 including nodes $N_1$ and $N_1+1$ (e.g., potential pop-up obstacle) and a second emergency event (e.g., ice) in a second time horizon 92 including nodes $N_2$ and $N_3$.

For example, $x_{n,n}$ is a position state when no emergency events are predicted, and $x_{e,n}$ is a position state when the first emergency event is predicted to occur (i.e., has a high probability, or a probability above a threshold). $x_{n,e}$ is a position state when the first emergency event is not predicted to occur, and the second emergency event is predicted to occur. $x_{e,e}$ is a position state when both emergency events are predicted to occur. Each node associated with an emergency event also includes an associated control action u.

In the example of FIG. 5, if a position state at the beginning of the time horizon 91 is not predicted to result in encountering an emergency event (the position state is $x_{n,n}$), the prediction tree 90 proceeds to node $H_1+1$ without branching. However, if the position state at the beginning of the time horizon 91 is predicted to result in encountering an emergency event (the position state is $x_{e,n}$), the prediction tree 90 proceeds to node $H_1+1$ with branching. The prediction tree 90 may similarly branch in the time horizon 92 as shown in FIG. 5.

During operation, the prediction module 72 determines a probability of an event for a given time window. If the probability of an emergency event occurring is above a threshold (or more probable than the nominal condition), the prediction module 72 determines a suggested control action u. As the prediction module 72 processes the decision tree 90, there may be multiple emergency events in more than one time window. In such an instance, the suggested control action may combine multiple actions to address the emergency events.

In an embodiment, a vehicle prediction model is used to describe the vehicle dynamics (e.g., speed, heading, yaw, etc.) and position states of the vehicle 10. The vehicle prediction model also optimizes control actions according to various constraints.

Figure 6:
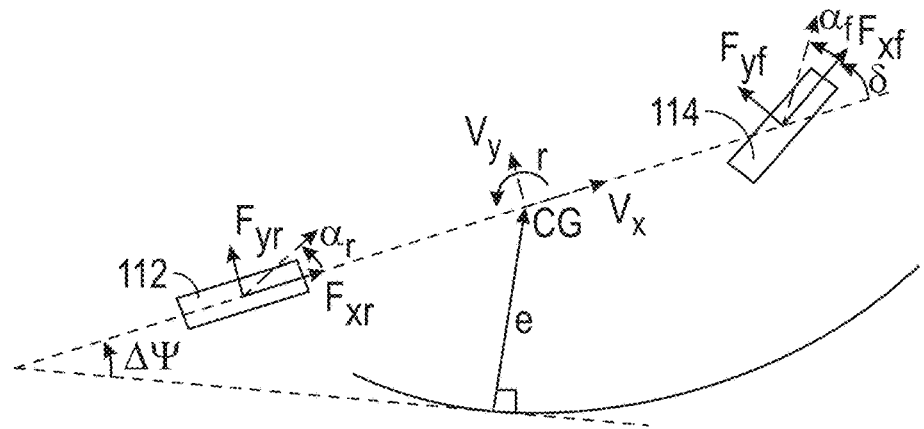
FIG. 6 depicts aspects of a simplified vehicle model, in accordance with an exemplary embodiment.

In an embodiment, the vehicle prediction model is a control-oriented model that uses a planar bicycle model shown in FIG. 6. The planar bicycle model includes two velocity states (longitudinal velocity $v_x$ and lateral velocity $v_y$), yaw rate r, position states 112 and 114, a heading deviation $\Delta\psi$ and lateral deviation e.

The desired longitudinal velocity $v_x$ along a path is given, and a longitudinal controller is used to calculate the required torque to follow the desired longitudinal velocity. The lateral dynamics of the vehicle may be described using the following equations for lateral acceleration and changes in yaw rate:

$$\dot{v}_y + \frac{F_{yf} + F_{yr}}{m} - g(\cos(\theta_r)\sin(\phi_r) + \sin(\theta_r)\Delta\psi) - v_x r,$$

where:

$$\dot{v}_y = \frac{l_f F_{yf} - l_r F_{yr}}{m}.$$

In the above, m is the vehicle mass, $I_z$ is the vehicle moment of inertia, g is gravitational acceleration, and $I_f$ and $I_r$ are distances from the front and rear axles to the vehicle center of gravity (CG). $\theta_r$ is road grade and $\Phi_r$ is road banking angle. $F_{yf}$ and $F_{yr}$ and the front and rear tire forces, respectively.

The tire forces may be determined using a brush tire model that captures the lateral force drop that results from an applied longitudinal force. The tire force $F_y$ on a tire is represented by:

$$F_y = \begin{cases} -C_\alpha \tan\alpha + \dfrac{c_\alpha^2}{3\xi u F_z}|\tan\alpha|\tan\alpha - \dfrac{c_\alpha^3}{27\xi^2\mu^2 F_z^2}\ \tan^2\alpha & |\alpha| < \alpha_{sl}, \text{where} \\ -\xi u F_z \operatorname{sgn}\alpha & |\alpha| \ge \alpha_{sl} \end{cases}$$

-continued $$\alpha_{sl} = \arctan \frac{3\xi u F_z}{c_\alpha}.$$

$C_\alpha$ is tire cornering stiffness, $F_z$ is the normal load on the tire, $\alpha$ is slip angle, $\mu$ is road friction, and $\xi$ is a derating factor.

The derating factor represents the remaining lateral force capacity based on a friction limit circle as follows:

$$\xi = \sqrt{1 - \left(\frac{F_x}{\mu F_z}\right)^2},$$

where $F_x$ is longitudinal force.

The front tires slip angle $\alpha_f$ and the rear tires slip angle $\alpha_r$ are determined based on:

$$\alpha_f = \frac{v_y + l_f r}{v_x} - \delta,$$

$$\alpha_r = \frac{v_y - l_r r}{v_x}.$$

The nonlinear tire force of the rear axle ($F_{yr}$) is linearized at each time step around the vehicle's current operating point. The front lateral force ($F_{yf}$) is considered as the control input instead of steering angle $\delta$, and is then mapped to the steering angle. The lateral dynamics are then written as affine functions of the velocity and yaw states:

$$\dot{v}_y = \frac{F_{yf} + \overline{F}_{yr} + \overline{C}_{\alpha_r}(\alpha - \overline{\alpha}_r)}{m} - g \sin(\phi_r) \cos(\theta_r) - v_x r,$$

$$\dot{r} = \frac{l_f F_{yf} - l_r \left(\overline{F}_{yr} + \overline{C}_{\alpha_r}(\alpha - \overline{\alpha}_r)\right)}{I_z},$$

where $\overline{F}_{yr}$, $\overline{F}_{yr}$, and $\overline{F}_{yr}$ are the rear axle's lateral force, the rear slip angle and cornering stiffness, respectively. The position states of heading deviation $\Delta\psi$ and lateral deviation $e$ are local to a path with a given curvature $\kappa(s)$, road grade $\theta_r(s)$ and road banking angle $\phi(s)$, which specify the equations of motion as:

$$\Delta\psi = r - u\kappa(s) \cos(\phi_r) \cos(\theta_r),$$

$$\dot{e} = u\Delta\psi + v.$$

The resulting continuous-time vehicle model includes vehicle dynamics and position states, and can be represented as follows:

$$\dot{x} = A_c x + B_c u + d_c,$$

where x is a state vector having a number of vehicle states, and u is a control action.

For example, x and u are represented as follows:

$$x = [\, v_y \quad r \quad \Delta\psi \quad e \,],$$

$$u = F_{yf}.$$

The coefficients of the vehicle model are:

$$A_c = \begin{bmatrix} \dfrac{\overline{C}_{\alpha_r}}{mv_x} & \dfrac{-l_r \overline{C}_{\alpha_r}}{mv_x} - v_x & -g\sin(\theta_r) & 0 \\ -\dfrac{l_r \overline{C}_{\alpha_r}}{I_z v_x} & \dfrac{l_r^2 \overline{C}_{\alpha_r}}{I_z v_x} & 0 & 0 \\ 0 & 1 & 0 & 0 \\ 1 & 0 & v_x & 0 \end{bmatrix},$$

$$B_c = \begin{bmatrix} \dfrac{1}{m} \\ \dfrac{l_f}{I_z} \\ 0 \\ 0 \end{bmatrix},$$

$$d_c = \begin{bmatrix} \dfrac{\overline{F}_{yr} - \overline{C}_{\alpha_r}\overline{\alpha}_r}{m} - g\sin(\phi_r)\cos(\theta_r) \\ -\dfrac{l_r\left(\overline{F}_{yr} - \overline{C}_{\alpha_r}\overline{\alpha}_r\right)}{I_z} \\ -v_x \kappa(s)\cos(\phi_r)\cos(\theta_r) \\ 0 \end{bmatrix}.$$

The continuous model is then discretized as:

$$x(k + 1) = A_k\, x(k) + B^k u(k) + d^k.$$

The overall system model (i.e., driver model and vehicle model) is extended to include all prediction horizons. For example, for three potential emergency events in a prediction window, the variable position states are denoted as $x_{i,i,i}$ the discretized system model can be represented, for k time steps, as:

$$x(k+1) = \begin{bmatrix} x_{n,n,n}(k+1) \\ x_{n,n,e}(k+1) \\ \vdots \\ x_{e,e,e}(k+1) \end{bmatrix} = \begin{bmatrix} A_{n,n,n}^k & 0 & 0 & 0 \\ 0 & A_{n,n,e}^k & 0 & 0 \\ 0 & 0 & \ddots & 0 \\ 0 & 0 & 0 & A_{e,e,e}^k \end{bmatrix} \begin{bmatrix} x_{n,n,n}(k) \\ x_{n,n,e}(k) \\ \vdots \\ x_{e,e,e}(k) \end{bmatrix} +$$

$$\begin{bmatrix} B_{n,n,n}^k & 0 & 0 & 0 \\ 0 & B_{n,n,e}^k & 0 & 0 \\ 0 & 0 & \ddots & 0 \\ 0 & 0 & 0 & B_{e,e,e}^k \end{bmatrix} \begin{bmatrix} u_{n,n,n}(k) \\ u_{n,n,e}(k) \\ \vdots \\ u_{e,e,e}(k) \end{bmatrix} +$$

$$\begin{bmatrix} C_{n,n,n}^k & 0 & 0 & 0 \\ 0 & C_{n,n,e}^k & 0 & 0 \\ 0 & 0 & \ddots & 0 \\ 0 & 0 & 0 & C_{e,e,e}^k \end{bmatrix} \begin{bmatrix} x_{n,n,n}(k+1) \\ x_{n,n,e}(k+1) \\ \vdots \\ x_{e,e,e}(k+1) \end{bmatrix} + \begin{bmatrix} d_{n,n,n}(k) \\ d_{n,n,e}(k) \\ \vdots \\ d_{e,e,e}(k) \end{bmatrix}$$

Optimization of the control actions may be performed using an objective function $J_e$, defined as:

$$J_e = \sum_{k=1}^{N} \begin{bmatrix} x_{n,n,n}^k \\ x_{n,n,e}^k \\ \vdots \\ x_{e,e,e}^k \end{bmatrix}^T \begin{bmatrix} P^{n,n,n}Q^{n,n,n} & 0 & 0 & 0 \\ 0 & P^{n,n,e}Q^{n,n,e} & 0 & 0 \\ 0 & 0 & \ddots & 0 \\ 0 & 0 & 0 & P^{e,e,e}Q^{e,e,e} \end{bmatrix} \begin{bmatrix} x_{n,n,n}^k \\ x_{n,n,e}^k \\ \vdots \\ x_{e,e,e}^k \end{bmatrix} +$$

$$\begin{bmatrix} \Delta u_{n,n,n}^k \\ \Delta u_{n,n,e}^k \\ \vdots \\ \Delta u_{e,e,e}^k \end{bmatrix}^T \begin{bmatrix} P^{n,n,n}M^{n,n,n} & 0 & 0 & 0 \\ 0 & P^{n,n,e}M^{n,n,e} & 0 & 0 \\ 0 & 0 & \ddots & 0 \\ 0 & 0 & 0 & P^{e,e,e}M^{e,e,e} \end{bmatrix} \begin{bmatrix} \Delta u_{n,n,n}^k \\ \Delta u_{n,n,e}^k \\ \vdots \\ \Delta u_{e,e,e}^k \end{bmatrix} +$$

$$\begin{bmatrix} W_r^{n,n,n} & W_r^{n,n,e} & \ldots & W_r^{e,e,e} \end{bmatrix} \begin{bmatrix} sr_{n,n,n}(k) \\ sr_{n,n,e}(k) \\ \vdots \\ sr_{e,e,e}(k) \end{bmatrix} +$$

$$\begin{bmatrix} W_\beta^{n,n,n} & W_\beta^{n,n,e} & \ldots & W_\beta^{e,e,e} \end{bmatrix} \begin{bmatrix} s\beta_{n,n,n}(k) \\ s\beta_{n,n,e}(k) \\ \vdots \\ s\beta_{e,e,e}(k) \end{bmatrix} +$$

$$\begin{bmatrix} W_e^{n,n,n} & W_e^{n,n,e} & \ldots & W_e^{e,e,e} \end{bmatrix} \begin{bmatrix} se_{n,n,n}(k) \\ se_{n,n,e}(k) \\ \vdots \\ se_{e,e,e}(k) \end{bmatrix}$$

In the objective function $J_e$, the subscripts i include a subscript n indicative of a nominal condition at a given time step, and a subscript e indicative of an emergency event or condition for which a control action is associated.

In the objective function $J_e$, $sr_{i,i,i}$ is a slack variable for a yaw rate constraint for each prediction path, $s\beta_{i,i,i}$ is a slack variable for a sideslip constraint for each prediction path, and $se_{i,i,i}$ is a slack variable for a lateral deviation constraint for each prediction path. $P^{i,i,i}$ is the probability of each prediction path, $Q^{i,i,i}$ is a tracking weight of each prediction path, and $M^{i,i,i}$ is a weight for proximity of control actions for each prediction path, $$W_r^{i,i,i}$$

is a weight of the yaw rate constraint slack variable for each prediction path, $$W_\beta^{i,i,i}$$

is a weight of the sideslip constraint slack variable, and $$W_e^{i,i,i}$$

is a weight of the lateral deviation constraint slack variable,

The objective function $J_e$ is subject to the discrete-time model as well as various constraints. Such constraints may include control action constraints, slew rate constraints, a yaw rate stability soft constraint, a sideslip stability soft constraint and lateral deviation soft constraint (collision avoidance).

For example, the slack variables are constrained as being non-negative:

$$\begin{bmatrix} sr_{n,n,n}^k \\ sr_{n,n,e}^k \\ \vdots \\ sr_{e,e,e}^k \end{bmatrix} \geq 0, \quad \begin{bmatrix} s\beta_{n,n,n}^k \\ s\beta_{n,n,e}^k \\ \vdots \\ s\beta_{e,e,e}^k \end{bmatrix} \geq 0, \quad \begin{bmatrix} se_{n,n,n}^k \\ se_{n,n,e}^k \\ \vdots \\ se_{e,e,e}^k \end{bmatrix} \geq 0.$$

The objective function may also be subject to equality constraints for position states as follows:

$$x_{n,n,n}^k = x_{n,n,e}^k \ldots = x_{e,e,e}^k \text{ for } k = 1: N_1,$$

$$x_{n,n,n}^k = x_{n,n,e}^k = x_{n,e,n}^k = x_{n,e,e}^k \text{ for } k = N_1 + 1: N_2,$$

$$x_{e,n,n}^k = x_{e,n,e}^k = x_{e,e,n}^k = x_{e,e,e}^k \text{ for } k = N_1 + 1: N_2,$$

$$x_{n,n,n}^k = x_{n,n,e}^k \text{ for } k = N_2 + 1: N_3,$$

$$x_{n,e,n}^k = x_{n,e,e}^k \text{ for } k = N_2 + 1: N_3,$$

$$x_{e,n,n}^k = x_{e,n,e}^k \text{ for } k = N_2 + 1: N_3,$$

$$x_{e,e,n}^k = x_{e,e,e}^k \text{ for } k = N_2 + 1: N_3.$$

The objective function may be further subject to control action equality constraints as follows:

$$u_{n,n,n}^{N_1+1} = u_{e,n,n}^{N_1+1},$$

$$u_{n,n,n}^{N_2+1} = u_{n,e,n}^{N_2+1},$$

$$u_{e,n,n}^{N_2+1} = u_{e,e,n}^{N_2+1},$$

$$u_{n,n,n}^{N_3+1} = u_{n,n,e}^{N_3+1},$$

$$u_{n,e,n}^{N_3+1} = u_{n,e,e}^{N_3+1},$$

$$u_{e,n,n}^{N_3+1} = u_{e,n,e}^{N_3+1},$$

$$u_{e,e,n}^{N_3+1} = u_{e,e,e}^{N_3+1},$$

Additional constraints may be applied, including a yaw rate stability constraint, a sideslip stability constraint and/or a lateral deviation constraint. The yaw rate stability constraint is as follows:

$$r_{min} \leq r \leq r_{max}, \text{ where:}$$

$$r_{min} = \frac{-\mu \xi_r \left( g\cos(\phi_r)\cos(\theta_r) + \kappa v_x^2 \sin(\varphi_r)\cos(\theta_r) \right) - g\sin(\varphi_r)\cos(\theta_r)}{v_x},$$

$$r_{max} = \frac{\cos(\theta_r)}{v_x} \mu \xi_r \left( g\cos(\varphi_r) + \kappa v_x^2 \sin(\varphi_r) \right) - g\sin(\varphi_r).$$

The sideslip stability constraint is as follows:

$$\frac{l_r}{v_x} - \alpha_{r,sat} \leq \beta \leq \frac{l_r}{v_x} + \alpha_{r,sat}.$$

where $\alpha_{r,sat}$ is a saturated (maximum) rear slip angle. The lateral deviation constraint is as follows:

$$e_{min}(k) \leq e(k) \leq e_{max}(k).$$

Referring again to FIG. 3, at block 105, the optimized control actions are presented to the driver as suggested actuator controls or actuator inputs. The suggestion may take any suitable form, such as visual, audible, haptic or a combination thereof.

For example, the interface 80 may be a real time advisory module that presents information and suggestions to the driver. The module may be configured to provide an augmented reality display or screen display that indicates obstacles and the surrounding environment, a predicted optimal path (e.g., from global optimization) and predicted optimal actuator commands (suggested control actions). A haptic system may provide directional information and/or warnings. The magnitude of a haptic signal may be controllable based on, for example, an urgency or imminence of a predicted event.

For example, an augmented reality display projected on the windshield can provide information about obstacles or other emergency events and their probabilities, local position of the vehicle, current actuator commands, potential changes in road grade, banking and curvature, and others.

The display can provide textual and/or visual suggestions for the optimal path (e.g., path and speed profile). The suggestions assist the driver in making decisions and finding the best way to traverse a road section or turn, and/or react to an emergency event. Depending on the situation, different options may be given to the driver. For example, if an obstacle is predicted, multiple suggestions may be presented. The driver can decide which option to take based on, for example, the driver's preferred driving style. Predictions for the level of downforce to be applied can be presented, to inform the driver and reduce any conflicts between the driver and downforce actuators.

At block 106, the vehicle 10 is controlled if the driver accepts the suggested actuator controls. For example, the driver can interact with the interface by engaging a touch screen, giving verbal or non-verbal assent, or otherwise indicate that the suggested actuator controls are agreed to. In another example, the driver can accept the suggestion by directly controlling the actuator(s) as suggested (e.g., by engaging the brakes, engaging the acceleration pedal, steering etc.).

Figure 7:
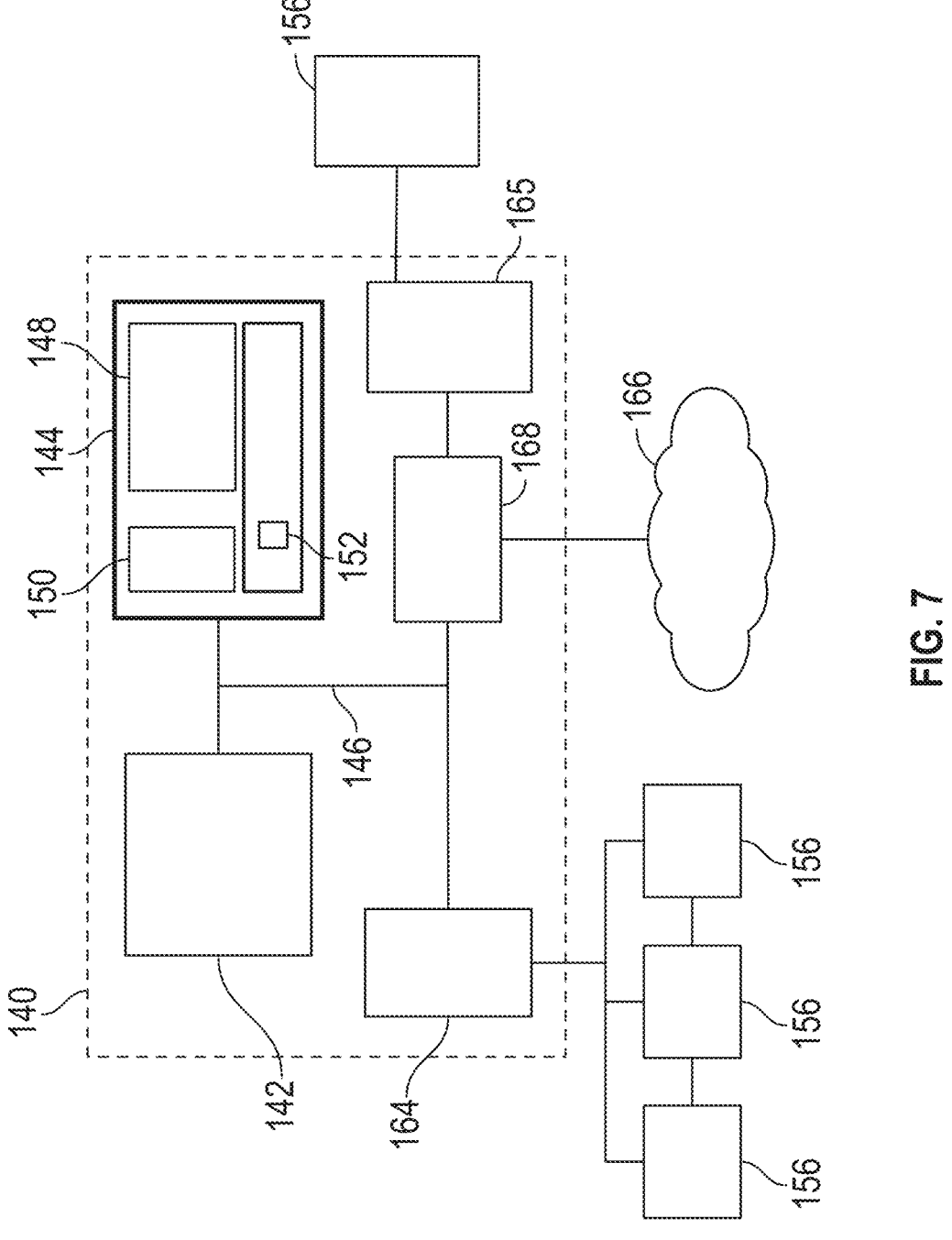
FIG. 7 depicts a computer system in accordance with an exemplary embodiment.

FIG. 7 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for interacting with a vehicle user, comprising:

an optimization module configured to determine a control strategy for traversing a selected route based on a probabilistic prediction of actuator inputs;

a monitoring module configured to monitor vehicle motion and vehicle user inputs during operation of a vehicle over the selected route;

a data fusion module configured to select a detection method from a plurality of detection methods for detecting emergency events, each detection method including a different combination of one or more types of detection modalities, the data fusion module configured to select the detection method for a given emergency event based on a probability function, the probability function specifying a first probability of detecting the given emergency event using a first detection method and a first reliability of the first detection method, the probability function specifying a second probability of detecting the given emergency event using a second detection method and a second reliability of the second detection method, the selected detection method including one of the first detection method and the second detection method based on the probability function being greater than or equal to a threshold, the selected detection method including both the first detection method and the second detection method based on the probability function being below the threshold;

a prediction module configured to predict an optimal local path for traversing a section of the selected route, and predict a set of optimal actuator control actions;

an interface module configured to present a suggested set of actuator commands to the vehicle user based on the set of optimal actuator control actions; and a control system configured to control the vehicle to execute the suggested set of actuator commands based on the vehicle user accepting the suggested set of actuator commands.

2. The system of claim 1, wherein the first reliability and the second reliability are based on at least one of a type of the given emergency event and a condition of an environment around the vehicle.

3. The system of claim 2, wherein the detection method is selected based on a probability the one or more detection modalities are selected from at least one of optical imaging, radar detection, lidar detection, location detection, temperature measurement and map information.

4. The system of claim 1, wherein the control strategy is determined based on a driver model and a vehicle model, and prescribes actuator input values over time that maximize performance of the vehicle in traversing the selected route.

5. The system of claim 4, wherein the control strategy is determined based on a surrogate model constructed from the driver model.

6. The system of claim 1, wherein the prediction module is configured to probabilistically predict the optimal local path over a plurality of successive time horizons based on the control strategy and a probability of encountering an emergency event during each successive time horizon.

7. The system of claim 1, wherein the selected route is a pre-planned route along a road having known parameters, and the control strategy is determined to optimize actuator inputs to minimize an amount of time required to traverse the pre-planned route.

8. A method of interacting with a vehicle user, comprising:

determining, by an optimization module, a control strategy for traversing a selected route based on a probabilistic prediction of actuator inputs;

monitoring vehicle motion and vehicle user inputs during operation of a vehicle over the selected route;

selecting a detection method from a plurality of detection methods for detecting emergency events, each detection method including a different combination of one or more types of detection modalities, wherein selecting the detection method for a given emergency event is based on a probability function, the probability function specifying a first probability of detecting the given emergency event using a first detection method and a first reliability of the first detection method, the probability function specifying a second probability of detecting the given emergency event using a second detection method and a second reliability of the second detection method, the selected detection method including one of the first detection method and the second detection method based on the probability function being greater than or equal to a threshold, the selected detection method including both the first detection method and the second detection method based on the probability function being below the threshold;

predicting, by a prediction module, an optimal local path for traversing a section of the selected route, and predicting a set of optimal actuator control actions;

presenting a suggested set of actuator commands to the vehicle user based on the set of optimal actuator control actions; and controlling the vehicle to execute the suggested set of actuator commands based on the vehicle user accepting the suggested set of actuator commands.

9. The method of claim 8, wherein the first reliability and the second reliability are based on at least one of a type of the given emergency event and a condition of an environment around the vehicle.

10. The method of claim 9, wherein the one or more detection modalities are selected from at least one of optical imaging, radar detection, lidar detection, location detection, temperature measurement and map information.

11. The method of claim 8, wherein the control strategy is determined based on a driver model and a vehicle model, and prescribes actuator input values over time that maximize performance of the vehicle in traversing the selected route.

12. The method of claim 11, wherein the control strategy is determined based on a surrogate model constructed from the driver model.

13. The method of claim 8, wherein predicting the optimal local path includes probabilistically predicting the optimal local path over a plurality of successive time horizons based on the control strategy and a probability of encountering an emergency event over each successive time horizon.

14. The method of claim 8, wherein the selected route is a pre-planned route along a road having known parameters, and the control strategy is determined to optimize actuator inputs to minimize an amount of time required to traverse the pre-planned route.

15. A vehicle system comprising:

a memory having computer readable instructions; and a processing device for executing the computer readable instructions, the computer readable instructions controlling the processing device to perform:

determining a control strategy for traversing a selected route based on a probabilistic prediction of actuator inputs;

monitoring vehicle motion and vehicle user inputs during operation of the vehicle over the selected route;

selecting a detection method from a plurality of detection methods for detecting emergency events, each detection method including a different combination of one or more types of detection modalities, wherein selecting the detection method for a given emergency event is based on a probability function, the probability function specifying a first probability of detecting the given emergency event using a first detection method and a first reliability of the first detection method, the probability function specifying a second probability of detecting the given emergency event using a second detection method and a second reliability of the second detection method, the selected detection method including one of the first detection method and the second detection method based on the probability function being greater than or equal to a threshold, the selected detection method including both the first detection method and the second detection method based on the probability function being below the threshold;

predicting an optimal local path for traversing a section of the selected route, and predicting a set of optimal actuator control actions;

presenting a suggested set of actuator commands to the vehicle user based on the set of optimal actuator control actions; and controlling the vehicle to execute the suggested set of actuator commands based on the vehicle user accepting the suggested set of actuator commands.

16. The vehicle system of claim 15, wherein the first reliability and the second reliability are based on at least one of a type of the given emergency event and a condition of an environment around the vehicle.

17. The vehicle system of claim 16, wherein the one or more detection modalities are selected from at least one of optical imaging, radar detection, lidar detection, location detection, temperature measurement and map information.

18. The vehicle system of claim 15, wherein the control strategy is determined based on a driver model and a vehicle model, and prescribes actuator input values over time that maximize vehicle performance in traversing the selected route.

19. The vehicle system of claim 15, wherein the control strategy is determined based on a surrogate model constructed from a driver model.

20. The vehicle system of claim 15, wherein predicting the optimal local path includes probabilistically predicting the optimal local path over a plurality of successive time horizons based on the control strategy and a probability of encountering an emergency event over each successive time horizon.

\* \* \* \* \*